Nov. 9, 1965  A. K. FOEDISCH  3,216,678
OPTICAL RAIL DEVICE
Filed July 10, 1963  2 Sheets-Sheet 1
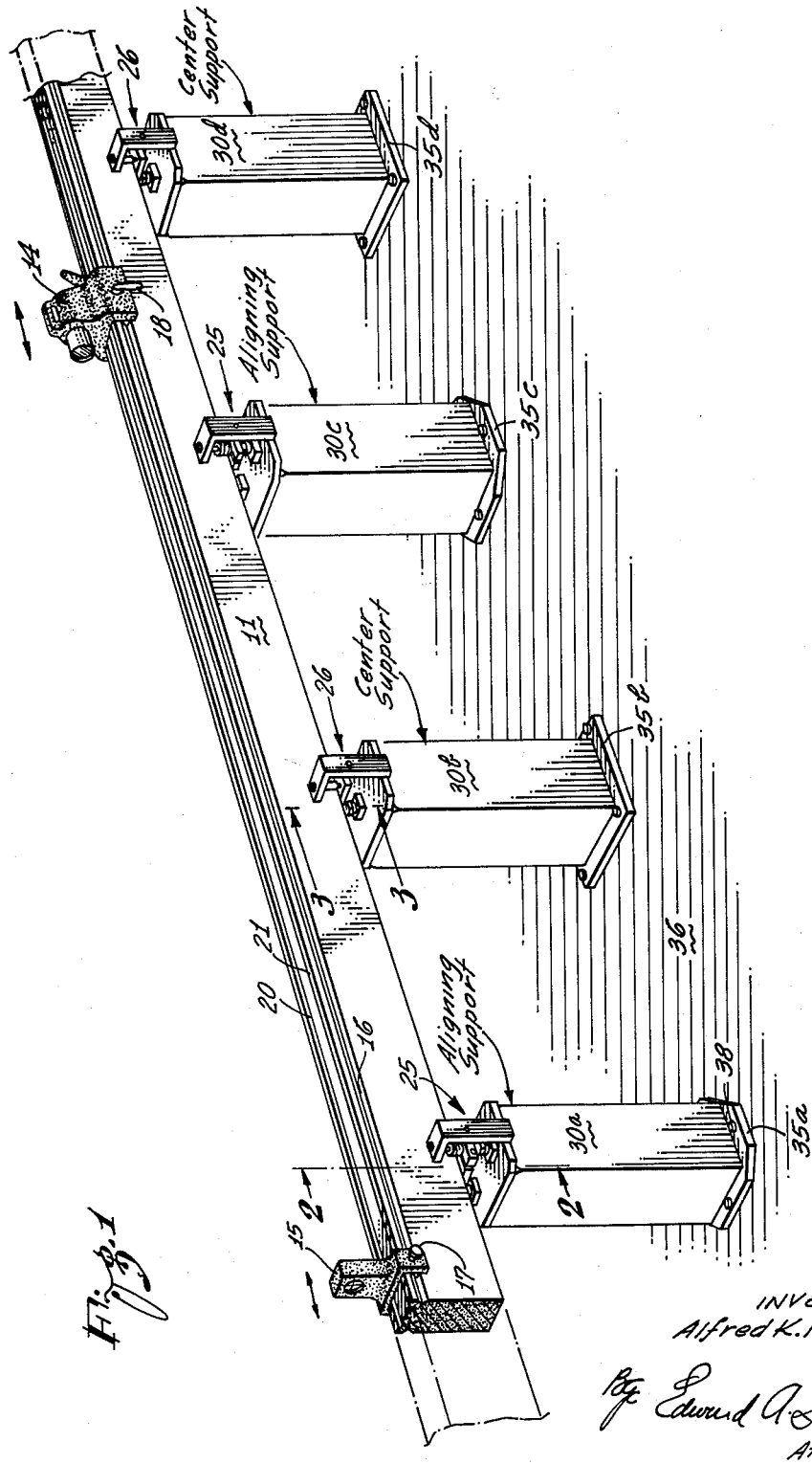
INVENTOR:
Alfred K. Foedisch
By Edward A. Sokolski
Attorney

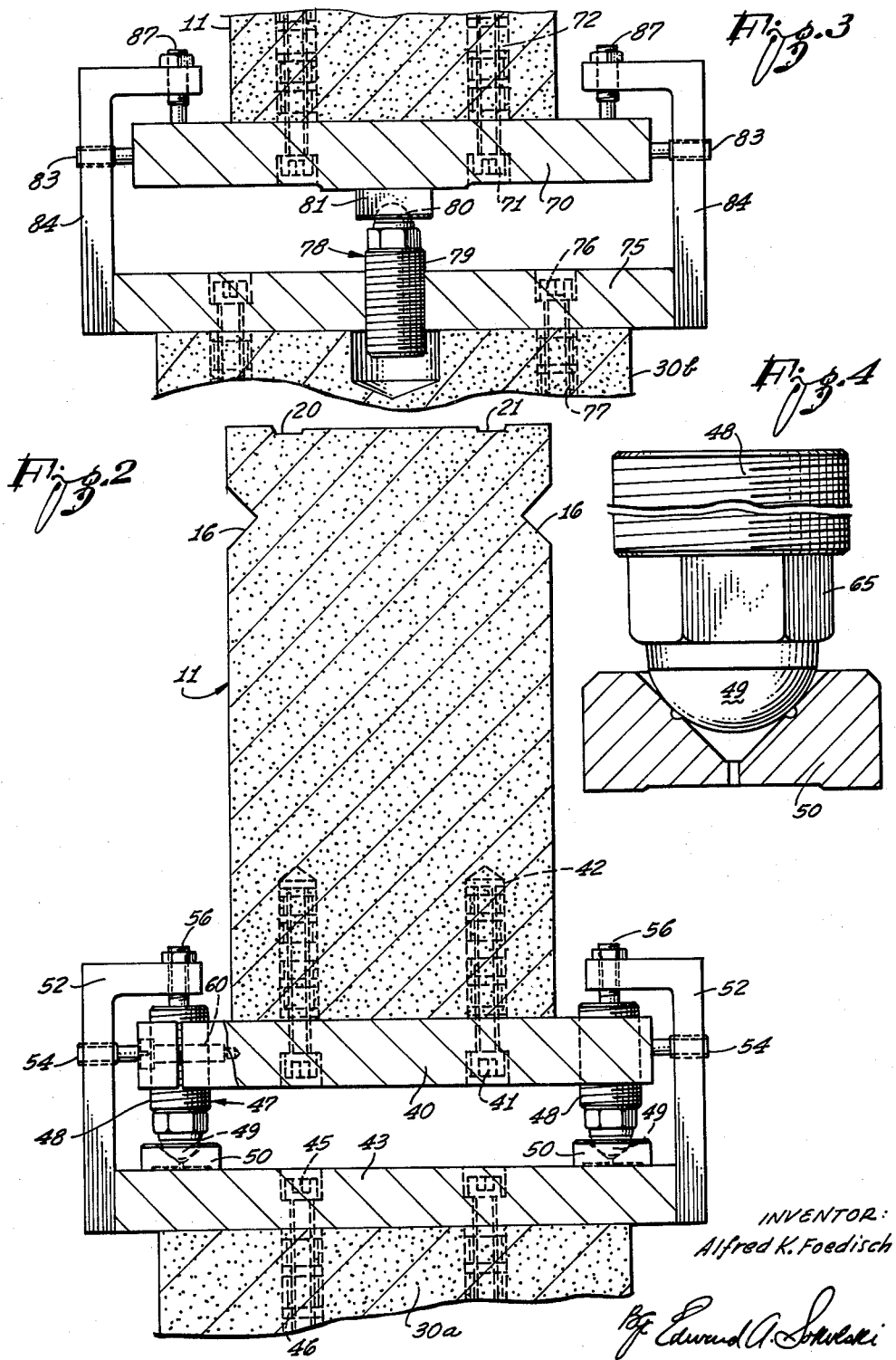

United States Patent Office 3,216,678
Patented Nov. 9, 1965

3,216,678
OPTICAL RAIL DEVICE
Alfred K. Foedisch, Los Angeles, Calif., assignor to Northrop Corporation, Beverly Hills, Calif., a corporation of California
Filed July 10, 1963, Ser. No. 293,985
3 Claims. (Cl. 248—1)

This invention relates to an optical rail device and more particularly to such a device suitable for testing and aligning precision optical equipment.

Optical equipment is often tested and aligned in conjunction with an optical rail device on which a suitable light source and focusing and alignment means therefor are mounted. The rail device is generally precisely levelled and the light source and its related equipment then aligned thereon. Prior art optical rail devices have generally utilized a longitudinal bed or rail member fabricated of a metal such as steel which is mounted on a metal support.

While such prior art devices are adequate for normal precision applications, they have been unable to meet the extremely high precision requirements of optical equipment of the type utilized in aircraft, spacecraft and missile guidance systems. These inadequacies are due primarily to the inadequate vibration characteristics of metallic rail devices which have a comparatively low internal damping rate and to the lack of stability of such devices with variations of temperature and humidity. Also such metallic rail devices, due to oxidation of the surfaces thereof, require relatively frequent cleaning to assure precision operation.

The device of this invention overcomes the shortcomings of prior art optical rail devices by providing a longitudinal bed or rail member which is fabricated of granite. This longitudinal bed member is supported on a plurality of support pedestals, which are also fabricated of granite, by means of supporting bracket members. The bracket members which may be fabricated of metal including a pair of plates, one of such plates being attached to the bed member, the other of the plates being attached to one of the pedestals. Vertically adjustable ball support means is provided to support the top plate on the bottom plate. The plates may thereby be adjusted relative to each other vertically. Means are also provided for adjusting the plates relative to each other laterally.

In view of the high internal damping rate of the granite pedestals and bed member, the device of the invention is substantially unaffected by ambient vibrations. The device of this invention further has extremely high stability characteristics under relatively large variations in temperature and humidity, and once optical equipment mounted thereon has been aligned it precisely maintains the aligned position for long periods of time. The granite bed member has a more superior surface quality than its metallic counterpart and is not subject to oxidation. The granite pedestals substantially isolate the bed from vibrations in the supporting floor.

It is therefore an object of this invention to provide an improved optical rail device.

It is a further object of this invention to provide an optical rail device having higher precision capabilities than prior art devices.

It is still a further object of this invention to provide an optical rail device which remains stable over long periods of operation and is substantially insensitive to ambient vibrations.

It is another object of this invention to provide an optical rail device which is substantially insensitive to wide variations of temperature and humidity.

It is still another object of this invention to facilitate the optical alignment and testing of high precision optical equipment.

Other objects of this invention will become apparent from the following description taken in connection with the accompanying drawings of which FIG. 1 is a perspective view of a preferred embodiment of the device of the invention, FIG. 2 is a cross-sectional view as taken along the plane indicated by the line 2—2 in FIG. 1, FIG. 3 is a cross-sectional view as taken along the plane indicated by the line 3—3 in FIG. 1, and FIG. 4 is a cross-sectional view showing the details of the ball support of the alignment bracket member of the embodiment shown in FIG. 1.

Referring now to FIG. 1, a perspective view of a preferred embodiment of the device of the invention is illustrated. The bed or rail member 11 which is fabricated of granite has a light source 14 and a reticle device 15 mounted thereon. Optical devices 14 and 15 can be positioned by sliding them along ways 16 formed in opposite sides of bed member 11. When they have been set in the proper positions, they may be tightly attached to the bed by means of screws 17 and 18 respectively. Parallel ways 20 and 21 formed in the top of bed 11 may also be used to guide optical devices used in conjunction with the device of the invention.

Support pedestals 30a–30d are aligned with each other in spaced relationship. Such pedestals are fabricated of granite. Bed member 11 is supported on pedestals 30a–30d by means of alignment bracket members 25 and support bracket members 26. A support bracket member 26 is interposed between each pair of alignment bracket members 25. Depending on the length of the bed member a greater or lesser number of support pedestals and support bracket members may be used than are shown in FIG. 1.

Support pedestals 30a–30d have respective bottom plates 35a–35d fixedly attached thereto. Such bottom plates are utilized to attach the pedestals to the floor 36, such attachment being accomplished by means of bolts 38.

Referring additionally now to FIGS. 2 and 4, the details of alignment bracket members 25 are illustrated. Top plate 40 is fixedly attached to bed member 11 by means of bolts 41 which engage lag shields 42 which are mounted in the bed member. Bottom plate member 43 is similarly attached to pedestal 30a by means of bolts 45 operating in conjunction with lag shields 46. Ball support member 47 has a threaded portion 48 which threadably engages a mating threaded portion of plate 40. The bottom end of the ball support 47 has a ball portion 49 which fits into receptacle 50, such receptacle being fixedly attached to bottom plate 43. A pair of L-shaped arms 52 are attached to opposite ends of bottom plate 43. Threadably attached to the sides of arms 52 are lateral adjustment screws 54. Threadably attached to the tops of arms 52 are locking screws 56.

Top plate 40 may be slightly adjusted laterally relative to bottom plate 43 by means of lateral adjustment screws 54 the ends of which abut against top plate 40. The distances separating each of the ends of plates 40 and 43 can be selectively adjusted by turning the ball supports 47 on their threads 48. In this manner, the levelling of the bed member can be accomplished. After levelling has been achieved, the ball support members 47 can be locked in the selected positions by means of locking screw 60 which draws a slotted portion of top plate 40 together to provide locking action and by tightening down screws 56 against the tops of the ball supports. The ball supports 47 are positioned by means of a wrench which will engage hexagonal portion 65.

Referring now to FIG. 3, the details of the support bracket members 26 shown in FIG. 1 are illustrated.

Top plate 70 is fixedly attached to bed member 11 by means of screws 71 operating in conjunction with lag shields 72. Bottom plate 75 is similarly attached to pedestal 30b by means of screws 76 operating in conjunction with lag shields 77. Ball support 78 has a threaded portion 79 which threadably engages bottom plate 75. On the top end thereof, ball support 78 has a ball portion 80 which fits into receptacle 81, this receptacle being fixedly attached to top plate 70. Top plate 70 is supported on bottom plate 75 by virtue of the mating engagement of ball 80 and receptacle 81. Ball support 78 is adjusted until the load of bed 11 is borne by plate 75. This adjustment can be made to provide minimum vibration in bed 11 with such bed in the aligned condition. In achieving optimum low vibration response, lateral adjustment is made by means of screws 83, which threadably engage the arms 84 of bottom plate 75 and abut against top plate 70 and screws 87 which threadably engage the tops of arms 84 are adjusted.

The alignment bracket members are thus utilized in precisely levelling bed 11 and the support bracket 26 are utilized to properly transfer the load to their associated pedestals to minimize vibration in the bed.

The device of this invention thus provides a simple yet highly precise optical rail device. The device has extreme stability over long periods of operation and is substantially insensitive to ambient vibrations.

While the device of the invention has been described and illustrated in detail it is clearly to be understood that this is presented by way of illustration and example only and is not to be taken by way of limitation, the spirit and scope of the invention being limited only by the terms of the following claims.

I claim:
1. In an optical rail device
  a longitudinal bed member fabricated of granite,
  a plurality of support pedestals fabricated of granite, said pedestals being aligned with each other in spaced relationship,
  a plurality of alignment bracket members, each of said alignment bracket members comprising a top plate fixedly attached to said bed member, a bottom plate member fixedly attached to one of said pedestals, means for supporting said top plate on said bottom plate, said plate support means including a pair of ball supports threadably attached to opposite ends of said top plate, and means for adjusting said plates relative to each other, said adjusting means including a pair of oppositely positioned L-shaped arms fixedly attached to opposite edges of said bottom plate and extending therefrom upwardly and inwardly successively and lateral adjustment screws threadably mounted in the upward extending portions of said arms, the ends of said screws abutting against the sides of said top plate, and
  a support bracket member interposed between each pair of successive alignment bracket members, each said support bracket member comprising a top plate fixedly attached to said bed member, a bottom plate fixedly attached to one of said pedestals, and means for adjustably supporting said top plate on said bottom plate, said supporting means including a ball support threadably attached to the central portion of said bottom plate.

2. The device as recited in claim 1 wherein said plate support means further includes a pair of receptacles fixedly attached to opposite ends of said bottom plate, said receptacles receiving said ball supports in mating engagement therewith.

3. The device as recited in claim 1 and additionally including locking screws threadably mounted on the inwardly extending portions of said arms, said locking screws extending downwardly against the top surface of said top plate.

References Cited by the Examiner

UNITED STATES PATENTS

| | | | |
|---|---|---|---|
| 1,849,305 | 3/32 | Magarian | 248—23 |
| 2,004,238 | 6/35 | Fithian | 248—23 |
| 2,581,591 | 1/52 | Koppe | 88—24 |
| 2,643,844 | 6/53 | Nette | 248—180 |
| 2,739,773 | 3/56 | Rougemont | 248—19 X |
| 2,750,118 | 6/56 | Hastings et al. | 50—148 |
| 2,911,169 | 11/59 | Contreras | 248—23 X |

CLAUDE A. LE ROY, *Primary Examiner.*